3,222,418
CURABLE COATING COMPOSITION COMPRISING CARBOXYL CONTAINING COPOLYMER, A SECOND COPOLYMER AND AMINE/ALDEHYDE CONDENSATE OR EPOXY RESIN
James David Murdock, St. Hilaire Station, Quebec, Canada, assignor to Canadian Industries Limited, Montreal, Quebec, Canada, a corporation of Canada
No Drawing. Filed July 13, 1961, Ser. No. 123,632
Claims priority, application Great Britain, July 19, 1960, 25,142/60; Dec. 12, 1960, 42,642/60
3 Claims. (Cl. 260—834)

This invention relates to coating compositions and, more particularly, to coating compositions which may be heated after application to substrates to give hard, infusible films.

Processes for preparing such coating compositions are disclosed, for example, in Canadian Patent Nos. 534,002, 534,261 and 569,430. The compositions comprise a copolymer of styrene or vinyl toluene, acrylate and/or methacrylate esters and 2% to 15% of acrylic or methacrylic acids, together with a polyepoxide and a basic catalyst. On baking, these coating compositions become hard and infusible by a well known reaction, i.e. the base-catalysed cross-linking reaction of the epoxide groups of the polyepoxide with the free carboxylic acid groups of the copolymer. By this reaction the polymer chains are cross-linked to yield an infusible coating which has very desirable properties and is glossy, scratch resistant and not easily attacked by solvents or detergents.

Another similar process is disclosed in Canadian Patent No. 567,165. A copolymer of styrene, acryate or methacrylate esters and 3–15% by weight of acrylamide or methacrylamide is formed into a coating composition by mixing with 5–40%, by weight of the copolymer, of a nitrogen resin and an acidic catalyst. On baking, the acrylamide-containing copolymer is cross-linked by the nitrogen resin to give a hard, glossy finish. Similarly, in Canadian Patent No. 578,345, an acrylamide-containing copolymer is reacted with an aldehyde and the product is cross-linked on baking with a polyepoxide.

It has been found, however, that the above coatings lack the extreme flexibility that is required in applications where a metal is to be formed after coating, or where a coated article is dented and must be beaten out. Such flexibility can be obtained by greatly increasing the amount of acrylate ester in the copolymers, but such increases have a corresponding deleterious effect on the hardness and solvent resistance of the films.

It is an object of this invention to provide a broad range of coating compositions containing an acrylic or vinyl conolymer and a cross-linking agent, which compositions will bake to give hard, infusible films that possess surprising flexibility. Further objects are to provide such films attached to metal substrates, and to provide a process for making such compositions and films. Additional objects will appear hereinafter.

The coating compositions of this invention comprise, essentially, an acrylic or vinyl copolymer adapted to be cross-linked on heating, blended with from 5% to 30%, by weight of the copolymer, of a compatible polymeric resin selected from the group consisting of rubbery copolymers, nylons (being linear polyamides) and copolymers of styrene, substituted styrenes, mono-olefines, alkyl acrylates and alkyl methacrylates, a cross-linking agent for said copolymeric blend, and, if necessary, a catalyst for the cross-linking reaction.

The acrylic or vinyl copolymers may be prepared from a wide range of monomers; it is essential, however, that they be adapted to cross-link to hard, infusible masses upon heating. Amongst the means of achieving this cross-linking is the provision of reactive sites in the copolymers. These reactive sites may then react together upon heating, or a cross-linking agent and optionally a catalyst may be provided to yield the hard infusible products upon heating. Thus, for example, a copolymer may be prepared which contains free hydroxyl groups attached to the carbon chain. This may be accomplished by using as a monomer β-hydroxyethylmethacrylate, or by using acrylic acid as a monomer and subsequently reacting the acid groups with an olefinic oxide to yield β-hydroxyalkyl groups. Such a hydroxyl-containing copolymer, after blending with a compatible polymeric resin of the group defined hereinbefore, may be mixed with a nitrogen resin (hereinafter described) which serves as a cross-linking agent to yield a composition which will cross-link on heating to give a hard, infusible yet flexible film. The copolymer may suitably include about 0.7% to 4.5% by weight of hydroxyl groups, and the coating composition may contain about 5% to 50% by weight of the nitrogen resin.

Similarly, a copolymer may be prepared containing both acrylic acid and glycidyl acrylate, according to the disclosure of Canadian Patent 499,491. When such a copolymer is blended with a compatible polymeric resin, the resulting copolymeric blend will self-cross-link upon heating, preferably in the presence of a basic catalyst, to give a hard, infusible yet flexible film.

In one particularly advantageous embodiment of the present invention, the copolymer (to be blended with the compatible polymeric resin) may be similar to those disclosed in Canadian Patent Nos. 534,002, 534,261 and 569,430 and is thus a copolymer of ethylenically unsaturated monomers which includes between 2% and 15% by weight of an α,β-unsaturated carboxylic acid and between 85% and 98% of neutral monomers. The carboxylic acid groups in this copolymer form the reactive sites through which cross-linking is accomplished, and by "neutral" monomers is meant those monomers which contain no groups which yield a reactive site in the copolymer. The cross-linking agent for this copolymer may be a polyepoxide present in a concentration ranging from 5% to 55% by weight of the copolymer, and in this case a basic catalyst is included in the composition. Alternatively a nitrogen resin may be used to cross-link the acid-containing copolymer; particularly preferred is the resinous hexamethyl ether of hexamethylmelamine used in an amount between 5% and 50%, by weight of the copolymer, with an acid catalyst.

In another advantageous embodiment, the composition of the copolymer (to be blended with the compatible polymeric resin) includes between 3% and 15% by weight of acrylamide, methacrylamide or an N-methylol derivative thereof and between 85% and 97% of neutral monomers. In this case, the cross-linking agent, present in a concentration of about 5% to 50% by weight of the copolymer, is a nitrogen resin, and the catalyst is acidic.

In a still further embodiment, a copolymer containing from 5% to 40% by weight of an acrylamide is reacted with an aldehyde to substitute one or both of the amido hydrogen atoms by alkylol groups (as described in U.S. Patent No. 2,870,117). This copolymer is blended with a compatible polymer resin and then may be cross-linked on baking with 5% to 40% by weight of a polyepoxide, optionally using a basic or acidic catalyst.

Furthermore, in an acrylamide-containing copolymer, wherein only part of the amide groups are alkylol-substituted, no additional cross-linking agent is required, and a composition containing such a copolymer may be cross-linked by itself.

All these compositions, when applied to suitable metal substrates such as aluminum or phosphated steel, and baked thereon at a temperature between 110° C. and 200° C., react to give infusible coatings which possess the hitherto contradictory properties of hardness and flexibility. In particular, hard, solvent and detergent resistant films are produced which show a yield point on extension. This is best demonstrated by measuring stress-strain relationships on free films (i.e., those separated from the substrates) where prior coatings show a brittle break. The coatings of the present invention also show improved toughness as measured by the area under a stress-strain curve before rupture.

It has been known hitherto to blend an acrylic copolymer with another polymeric resin, but it is believed to be entirely novel and unexpected that when, in accordance with this invention, the copolymer is *subsequently cross-linked* to give a hard, infusible film, that film should possess greatly improved flexibility, even when quite small additions of a compatible polymeric resin are used. The properties of hardness and flexibility have not hitherto been simultaneously obtainable in this type of baking enamel; those known in the trade as "acrylics" have hitherto given a hard, glossy finish of very low low flexibility, whereas those known as "vinyls" have often given flexible coatings, but have been soft, readily marked and of dull appearance.

Thus the process process of this invention comprises, essentially, copolymerizing copolymerisable ethylenically unsaturated monomers including at least one monomer adapted to provide cross-linkable groups in the resultant copolymer, blending the so formed copolymer with from 5% to 30%, by weight of the copolymer, of a compatible polymeric resin selected from the group consisting of rubbery copolymers, nylons, and copolymers of styrene, substituted styrenes, mono-olefines, alkyl acrylates and alkyl methacrylates, and usually mixing the resultant copolymeric blend with reactive cross-linking agent for said copolymer and a suitable catalyst. The resultant composition is then applied as a coating film to a metallic substrate and baked thereon to yield a hard infusible and yet flexible coating.

The ethylenically unsaturated neutral monomers present in the acrylic or vinyl copolymers of the compositions of this invention are those known to copolymerize in solution with initiation by peroxide or azo type catalysts. The monomers include styrene and the alkylated styrenes such as vinyl toluene and α-methyl styrene, acrylic and methacrylic esters of alcohols containing 1–10 carbon atoms, such as methyl, ethyl, butyl and 2-ethyl-hexyl acrylates and methacrylates, vinyl chloride and minor proportions of other species such as acrylonitrile. If $\alpha,\beta$-ethylenically unsaturated acid monomers are used to provide cross-linkable groups in the copolymer, they may be selected from such acids as acrylic, methacrylic, maleic, fumaric, itaconic and crotonic acids.

In order that the advantages of the present invention be fully obtained, it is preferred that the copolymerizable monomers be selected so that, in the absence of the blended polymeric resin, the copolymers would give hard films when cross-linked. Thus, it is preferred that at least 20% by weight of the monomers be selected from the group of monomers yielding hard films, i.e., from styrene, vinyl toluene, vinyl chloride and methacrylate esters, or conversely that not more than 78% be an acrylate. Films made from compositions including copolymers containing more than 78% of acrylate esters tend to be so soft that any improvement in flexibility obtained by blending with a compatible polymeric resin is not readily demonstrated by the bump and bend tests described hereinafter on metal panels. The hard films used for protective coatings are of course within the preferred class.

It has been stated hereinbefore that the acrylic or vinyl copolymer must be blended with a compatible polymeric resin. By this it is meant that the polymeric resin blended with the acrylic or vinyl copolymer in the compositions of this invention must be compatible with said copolymer or very nearly so. Compatibility is most readily determined by mixing solution of the polymers and casting a film of the blend by evaporation. Compatible polymers will give a clear film; slight haze or opacity is no bar to the use of a polymeric blend in the present invention, but the film should be free from gross inhomogeneities and defects. Compatible resins are known to those whose solubility parameters (as defined by Hildebrand and Scott in "The Solubility of Non-Electrolytes," 3rd Edition, Reinhold Publishing Corp., New York, 1949) are the same or very nearly so. Another method of achieving compatibility is disclosed in copending Canadian application Serial No. 797,889 wherein it is disclosed that polymers containing basic or amido nitrogen groups have greatly enhanced compatibility with acid-containing copolymers, and vice versa. Thus, a preferred class of compatible polymeric resins, for use in this invention when the copolymer contains acid groups, consists of rubbery copolymers containing these basic or amido groups, nylons and polyesteramides wherein the amido group is part of the polymer chain, and also copolymers of styrene, substituted styrenes such as vinyl toluene and α-methyl styrene, mono-olefines such as ethylene and propylene, and alkyl acrylates and alkyl methacrylates, wherein each of such copolymers include amongst its monomeric constituents a monomer yielding such basic or amido nitrogen groups. Such monomers include 2 - vinylpyridine, 4-vinylpyridine, N:N-dimethylaminoethyl methylacrylate, acrylamide, methacrylamide, N-methylol acrylamide, crotonamide and vinyl phthalimide. Such monomers may be included in rubbery copolymers, which are generally copolymers of a major proportion of butadiene and a minor proportion of another monomer such as styrene, methyl methacrylate or acrylonitrile, and are generally made by emulsion polymerization. Such monomers are also included in copolymers with the styrenes and the alkyl acrylates and methacrylates such as methyl, ethyl, butyl, 2-ethyl hexyl and dodecyl acrylate and methacrylate, which are generally made by solution polymerization. Certain of the basic or amido-containing monomers may also be included in polyethylene or polypropylene made by polymerization of the appropriate monomers in well-known processes. In general, from 2% to 10% by weight of the basic or amido-containing monomer is sufficient to render the above copolymers compatible with the acid-containing copolymers that are to be subsequently cross-linked by a polyepoxide in the process and compositions of this invention. However, up to 50% of the basic monomers may be used if desired.

In a similar manner, the polymeric resins of the group consisting of rubbery copolymers and copolymers of styrene, substituted styrenes, mono-olefines, alkyl acrylates and alkyl methacrylates may be made compatible with amide-containing copolymers by the inclusion in the composition of the resins of an $\alpha,\beta$-ethylenically unsaturated acid. Such acids include acrylic, methacrylic, maleic, fumaric, itaconic and crotonic, and they may be included in the rubbery butadiene copolymer, and in the monoolefines and the styrene, acrylate and methacrylate copolymers by the methods given above for basic monomers.

When the cross-linkable groups in the acrylic or vinyl copolymers are hydroxyl groups, compatibility with the polymeric resin is best achieved by having basic or amido groups in the latter, and leaving a small number of carboxylic acid groups in the vinyl or acrylic copolymers. Indeed this method is generally applicable to other cross-linking systems to which this invention applies, but which are not exemplified herein.

It is believed to be a surprising and novel result that the blending of quite small amounts of compatible polymeric resins with the acrylic and vinyl copolymers will give to subsequently cross-linked films the hitherto contradictory properties of hardness and flexibility. In particular, the result is surprising in the case of the acrylate copolymers. A copolymer of 72% styrene, 20% ethyl acrylate and 8% acrylic acid may be cross-linked by a polyepoxide using a basic catalyst, to give an excellent hard solvent resistant film. This film is rather brittle, but its flexibility may be expected to improve as the amount of ethyl acrylate in the monomer mixture is increased. However, in order to improve the flexibility of the film significantly, as shown by the pump and bend tests described hereinafter, it is necessary to increase the amount of ethyl acrylate in the copolymer to about 50%; by this increase the hardness of the cross-linked film is greatly reduced, and it becomes very susceptible to attack by oil-soluble dyes, grease and detergent solutions. On the other hand, it will be shown in the examples hereinafter that as little as 5% of poly (ethyl acrylate) containing copolymerized acrylamide may be blended with the same copolymer, and the resulting cross-linked film has increased flexibility and still retains hardness and other properties indistinguishable from those of the film containing the non-blended copolymer.

The polyepoxide cross-linking reagents used in the compositions of this invention for copolymers containing acid groups or alkylol-substituted amide groups (optionally in the latter case), are generally known as epoxy resins and must contain on the average at least two epoxide groups per molecule. By epoxide group is meant the three membered cyclic inner ethers represented by:

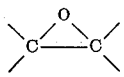

wherein the epoxy oxygen atom is linked to adjacent carbon atoms.

These cross-linking reagents are defined herein as polyepoxides and include both monomeric species, such as vinyl cyclohexene dioxide, and polymeric species such as the known epoxide resins. The latter are generally low molecular weight condensation products of epichlorohydrin and a polyhydric alcohol or phenol such as glycerol or diphenylol propane (bis-phenol A). It is preferred that the polyepoxide should have an epoxide content of at least 7.5% by weight, a melting point not exceeding 75° C. and a Gardner viscosity not exceeding 1.65 poises as a 40% solution in ethylene glycol dibutyl ether.

The basic catalyst used to catalyse the cross-linking reaction between acid and epoxide groups in the coating compositions of this invention may be selected from a wide variety of compounds of known efficiency. For conventional coatings applied from organic solution, basic organic nitrogen compounds are preferred. Inorganic bases may also be used, and particularly if the acid-containing copolymer is rendered dispersible or soluble in water by the method of copending Canadian application Serial No. 792,948, inorganic bases such as caustic soda, or preferably water soluble amines such as triethylamine, may be used as the cross-linking catalysts. However, for coatings applied from organic solution, the preferred catalysts are organic bases such as tertiary amines and quaternary ammonium hydroxides wherein at least one of the alkyl groups attached to the nitrogen atom has between 12 and 18 carbon atoms. Such catalysts should be present in an amount between about 1/10 and 1/100 of an equivalent, based on the acid in the copolymer. As an alternative in certain cases, the catalyst can be included as a nitrogen-containing monomer in the copolymer. For example in Canadian Patent No. 534,001, vinyl pyridine is included in an acid-containing copolymer and acts as a catalyst for subsequent cross-linking by a polyepoxide. Dimethylaminoethyl methacrylate also serves the same purpose.

The cross-linking reagents used in the compositions of this invention to cross-link the amide-containing copolymers are, as hereinbefore stated, nitrogen resins. These include the condensation products of formaldehyde with amine compounds such as urea, melamine and benzoguanamine. They are well accepted articles of commerce and are frequently sold in an alkylated form. Suitable catalysts for the cross-linking of amide-containing copolymers by such nitrogen resins are organic and inorganic acids or acid-yielding materials such as esters of the acids. Similar catalysts are also used to cross-link the alkylol-substituted acrylamide-containing copolymers with polyepoxides. Examples of such materials are boron trifluoride, aluminum chloride, perchloric acid, phosphoric acid, maleic acid, p-toluene sulphonic acid, n-butyl sulphamic acid, methane sulphonic acid, tetrachlorophthalic acid or its monobutyl ester and octadecylamine p-toluene sulphonate.

The catalysts or initiators employed for the copolymerization in the process of this invention are those commonly employed in vinyl-type solution polymerizations. They include the hydroperoxides of generic formula R—OOH, the dialkyl peroxides R—O—O—R, where R is an alkyl radical, and also the acetyl, benzoyl and similar peroxides

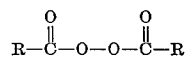

where R may be a linear or branched chain aliphatic radical or an aromatic hydrocarbon radical. Other known vinyl polymerization initiators include the azo type of formula—

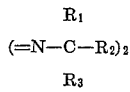

where $R_1$ is a lower alkyl or cycloalkyl radical, $R_2$ is a lower alkyl, cycloalkyl or acyl radical and $R_3$ is in a carbonitrile, carbonamide or carbalkoxy radical. Suitable catalysts thus include acetyle peroxide, benzoyl peroxide, tertiary-butyl perbenzoate, lauryl peroxide, dibutyryl peroxide, tertiary-butyl hydroperoxide, cumene hydroperoxide, azo-bis (isobutyronitrile) and azo-bis (isobutyrocarbonamide).

The following examples are given to illustrate the invention are are not to be construed as limiting the same. All parts and percentages are by weight unless otherwise stated.

EXAMPLE 1

A copolymer of vinyl toluene/ethyl acrylate/acrylic acid (72:20:8) and a copolymer of ethyl acrylate and dimethylaminoethylmethacrylate (96:4) were prepared separately by the following methods.

*Preparation of a vinyl toluene/ethyl acrylate/acrylic acid copolymer.*—265 g. of xylene were brought to reflux. Then the following 4 monomer charges were added successively over 1 hour.

| | | | | |
|---|---|---|---|---|
| Vinyl toluene, g | 72 | 72 | 72 | 72 |
| Ethyl acrylate, g | 20 | 20 | 20 | 20 |
| Acrylic acid, g | 5.3 | 6.4 | 8.7 | 11.2 |
| Benzoyl peroxide, g | 1 | 1 | 1 | 1 |
| Tert. butyl hydroperoxide,* g | 1.6 | 1.6 | 1.6 | 1.6 |

*60% solution is isopropanol.

The reaction was continued for another 4 hours. Then 50 g. of xylene and unreacted monomers were distilled off and 105 g. of xylene and 80 g. of butanol put back. The resulting solution had a total solid value of 50.0% and a Gardner viscosity of Y–X.

*Preparation of a copolymer of ethyl acrylate and dimethylaminoethyl methacrylate (DMAEMA).*—200 g. of toluene were brought to 70° C. under an atmosphere of nitrogen. Then the following four monomer charges were added successively over 1 hour while controlling the temperature at 70° C.

| | | | | |
|---|---|---|---|---|
| Ethyl acrylate, g | 80 | 80 | 80 | 80 |
| DMAEMA, g | 2.16 | 2.80 | 3.68 | 4.72 |
| Azo-bis (isobutyronitrile), g | 0.84 | 0.84 | 0.84 | 0.84 |

The reaction was continued for another 3 hours at 70° C. The resulting solution had a total solid value of 59.5%.

The resulting polymer solutions were blended, in the ratios given in Table I, by mixing and stirring by hand, and then an epoxy resin (defined hereinbefore) was added in an amount such that one equivalent of the epoxide group was present for each equivalent of acid in the copolymer, and a basic catalyst added (sufficient to bring the total amount of base, including DMAEMA up to 1/34 equivalent, based on acid). The epoxy resin was "Epon 828" (being a condensation product of epichlorohydrin and diphenylol propane), and the catalyst was a tertiary amine having one long chain substituent (coconut oil residue) and two methyl substituents. The resulting solutions were pigmented with $TiO_2$ pigment at a 1:1 pigment: binder ratio, and after spraying onto phosphated steel panels were baked at 150° C. for 30 minutes.

The result are compared in Table I.

*Table I*

| Percent ethyl acrylate—DMAEMA copolymer in blended polymer (solids basis) | Coin scratch | 90° bend | Bump test | |
|---|---|---|---|---|
| | | | In | Out |
| None | 5 | 0 | 6 | 3 |
| 5 | 5 | 3 | 7 | 2 |
| 10 | 5 | 2 | 10 | 5 |
| 20 | 4 | 3 | 10 | 6 |

From these results it can be seen that the hardness of the coating as shown by the coin scratch test was scarcely affected by the inclusion of the blended polymer, whereas the flexibility was improved. The bend test was a simple 90° bend of the panel over a sharp edge, whereas the bump test was an impact of 36 inch lbs. energy by a hemisphere 5/8 inch diameter. The results were rated visually, 10 being no defects; at about 8 minor cracking was observed at the apex of the bump; at about 5 the cracking extended part way down the bump; at about 3 the cracking extended around the bottom of the bump; and at 0 some flaking started. A similar scale was used for the 90° bend test results.

EXAMPLE 2

Similar results to those of Example 1 were obtained when the blended compatible resin was poly(ethyl acrylate) containing 6% of dimethylaminoethylmethacrylate. They are given in Table II.

*Table II*

| Percent ethyl acrylate—DMAEMA copolymer in blended polymer (solids basis) | Coin scratch | 90° bend | Bump test | |
|---|---|---|---|---|
| | | | In | Out |
| None | 5 | 0 | 6 | 3 |
| 5 | 5 | 3 | 10 | 5 |

EXAMPLE 3

This example illustrates the lower amounts of polyepoxide which may be used in the present invention. The experimental details are the same as those given in Example 1, except for the polyepoxide and the preparation of the compatible copolymer.

The latter was a copolymer of 96 parts of ethyl acrylate and 4 parts of acrylamide prepared by the following procedure.

A mixture of 750 g. of xylene, 500 g. of butanol, 100 g. of acrylamide and 1400 g. of ethyl acrylate was brought to reflux. The following monomer mixture was run in over 1½ hours:

| | Grams |
|---|---|
| Ethyl acrylate | 1000 |
| Benzoyl peroxide | 15.0 |
| Tert-butyl hydroperoxide | [1]16.0 |

[1] Of 60% sol.

The solution was kept at reflux for a further 4 hours, then 1250 g. of xylene were run in. The yield was a clear solution of polymer of 49.1% solids and viscosity R on the Gardner scale.

Coating compositions were prepared and coatings applied and tested by the procedures given in Example 1. The results are given in Table III.

*Table III*

PROPERTIES OF A COATING FROM A COPOLYMER OF VINYL TOLUENE, ETHYL ACRYLATE AND ACRYLIC ACID (72/20/8) MODIFIED BY BLENDING WITH A COMPATIBLE COPOLYMER

| Blended Polymer, wt., percent | Epoxide Resin and wt. percent | Coin scratch | 90° bend | Bump test | | Thickness, mils |
|---|---|---|---|---|---|---|
| | | | | In | Out | |
| None | "Epon 828," 22% | 4 | 3 | 6 | 6 | 1.5 |
| | | | 3 | 3 | 3 | 2.0 |
| Do | "Epon 828," 11% | 4 | 3 | 6 | 6 | 1.5 |
| | | | 3 | 3 | 2 | 2.0 |
| 10% copolymer of ethyl acrylate/acrylamide (96/4) | "Epon 828," 11% | 4 | 6 | 8 | 6 | 1.5 |
| | | | 5 | 6 | 5 | 2.0 |
| None | "Epon 562," 8.5% | 4 | 5 | 3 | 3 | 1.5 |
| | | | 3 | 0 | 0 | 2.0 |
| 10% copolymer of ethyl acrylate/acrylamide (96/4) | "Epon 562," 7.5% | 4 | 5 | 5 | 6 | 1.5 |
| | | | 3 | 2 | 2 | 2.0 |

"Epon 562" is a liquid epoxy resin which is a condensation product of epichlorohydrin and glycerol. Its epoxide equivalent is about 150 grams of resin per gram of epoxide group. It can be seen that the cure and hardness of the coating as shown by the coin scratch test is maintained at the lower epoxide level, while the improvement in flexibility due to the blend is still apparent.

EXAMPLE 4

Further coatings were prepared from a copolymer of styrene, ethyl acrylate and acrylic acid (approx. 70:20:10) blended with compatible copolymers of ethyl acrylate (EA) and acrylamide (AAm) or butyl acrylate (BA) and acrylamide. The cross-linking agent was "Epon 828" as in Example 1. The test results are in Table IV.

Table IV

| Blended polymer | Coin scratch | 90° bend | Bump test | |
|---|---|---|---|---|
| | | | In | Out |
| None | 4 | 2 | 6 | 3 |
| 2% BA/AAm (96/4) | 4 | 3 | 6 | 5 |
| 5% BA/AAm (96/4) | 4 | 5 | 7 | 5 |
| 10% BA/AAm (96/4) | 3 | 6 | 6 | 6 |
| 20% BA/AAm (96/4) | 3 | 8 | 6 | 7 |
| 5% EA/AAm (96/4) | 4 | 3 | 6 | 6 |
| 10% EA/AAm (96/4) | 3 | 3 | 6 | 6 |
| 20% EA/AAm (96/4) | 3 | 6 | 6 | 6 |

EXAMPLE 5

A different sample of the copolymer of Example 1 was blended with a number of compatible polymeric resins, being a rubbery copolymer and a series of copolymers of styrene, ethyl acrylate and methyl methacrylate. The results of tests on epoxide cross-linked, pigmented coatings are given in Table V, wherein the following abbreviations are used:

EA _____ Ethyl acrylate.
B _____ Butadiene.
DMAEMA _____ Dimethylaminoethyl methacrylate.
2 VP _____ 2 vinyl pyridine.
AAm _____ Acrylamide.
MMA _____ Methyl methacrylate.
S _____ Styrene.
AA _____ Acrylic acid.
N.R. _____ No result.
VT _____ Vinyl toluene.

Table V

| Blended polymer | Amount of polymer, percent | Coin scratch | 90° bend | Bump test | | Thickness, mils |
|---|---|---|---|---|---|---|
| | | | | In | Out | |
| None | 0 | 5 | 2 | 3 | 1 | |
| EA/AAm 96/4 | 20 | 4 | 8 | 8 | 8 | |
| EA/AAm 96/4 | 5 | 5 | 5 | 7 | 5 | |
| MMA/AAm 96/4 | 10 | 5 | 3 | 7 | 3 | 2.0 throughout. |
| | 5 | 5 | 3 | 7 | 2 | |
| Rubbery copolymer B/MMA/DMAEMA 75/15/10. | 5 | 5 | 10 | NR | NR | |
| S/2VP 95/5 | 5 | 5 | 3 | 7 | 3 | |

EXAMPLE 6

A copolymer was prepared from vinyl toluene (63 parts), ethyl acrylate (17.5 parts), acrylic acid (7 parts) and glycidyl methacrylate (12.5 parts). This material self-cross-links upon heating with no added catalyst. It was blended with 20% of an EA/AAm (96/4) compatible polymer, pigmented with TiO₂ (50%) and sprayed as a film on phosphated steel. After a 30 minute bake at 150° C., the coatings had the properties given in Table VI.

Table VI

| Blended polymer | 90° bend | Bump test | | Thickness, mils |
|---|---|---|---|---|
| | | In | Out | |
| None | 3 | 8 | 0 | 1.5 |
| 20% EA/AAm (96/4) | 9 | 10 | 3 | 1.5 |

EXAMPLE 7

A copolymer was prepared from styrene (58 parts), ethyl acrylate (35.75 parts) and acrylamide (6.25 parts). Such a copolymer may be cross-linked on baking with nitrogen resins, in the presence of an acid catalyst. Samples of the above copolymer were blended with 20% of an EA/AA (96/4) compatible polymer; 20% of two different nitrogen resins were added, with 0.5% of p-toluene sulphonic acid catalyst, and the composition pigmented with 45% of TiO₂, sprayed as a film on phosphated steel and baked at 150° C. for 30 minutes. The nitrogen resins were a commercial butylated urea formaldehyde resin (U.F.) and the resinous hexamethyl ether of hexamethylol melamine (M.F.). The results are given in Table VII.

Table VII

| Blended polymer, 20% | Cross-linking agent, 20% | 90° bend | Bump test | | Thickness, mils |
|---|---|---|---|---|---|
| | | | In | Out | |
| None | MF | 3 | 5 | 1 | 1.5 throughout. |
| | UF | 3 | 5 | 0 | |
| EA/AA 96/4 | MF | 8 | 5 | 7 | |
| | UF | 10 | 5 | 5 | |

A similar copolymer of styrene (38 parts), ethyl acrylate (55.75 parts) and acrylamide (6.25 parts) was prepared. Here the ethyl acrylate was essentially copolymerized instead of being blended according to this invention. A coating of this material gave the following test results:

MF _____ 7  5  2  1.5
UF _____ 7  5  1  1.5

Thus it can be seen that the blending of this invention is more effective than copolymerization in yielding a flexible coating.

EXAMPLE 8

Three further cross-linked baking enamels were examined and the merits of blending in the preformed compatible polymeric resin according to this invention were shown. In the first system the copolymer contained acid groups and the cross-linking agent was the MF resin of Example 7. The copolymers of Examples 1 and 4 were examined and excellent results shown; in addition other copolymers such as MMA/AA 92/8 were used. The results for coating compositions prepared as in earlier examples are given in Table VIII.

Additionally, copolymers containing acrylamide were reacted with formaldehyde to give copolymers containing N-methylol groups. These cross-link by themselves or with epoxy resins according to the disclosure of Canadian patent No. 578,345. These copolymers were blended with EA/AA compatible polymers according to this invention, and the improvement in flexibility of the resulting coatings are shown in Table VIII. A certain amount of acrylamide was left unalkylolated to help compatibility; the copolymer thus had the approximate composition S/EA/AAm/N-methol AAm. 68/20/6/6, and is referred to in Table VIII as "N-methylol."

In the third system, a copolymer containing hydroxyl groups was cross-linked with a U.F. or M.F. resin. The prepared copolymer was nearly the same as Example 1, but had 12% of acrylic acid. Of this acid 10% was then reacted with butylene oxide to give β-hydroxybutyl groups. This copolymer is referred to in Table VIII as "hydroxyl"; the tests are on pigmented films, sprayed and baked at 150° C. for 30 minutes, being catalysed with 0.75% p-toluene sulphonic acid, thickness 1.5 mils.

Table VIII

| Copolymer | Blended resin | Cross-linking agent | 90° bend | Bump test In | Bump test Out |
|---|---|---|---|---|---|
| MMA/AA | None | M.F. 18% | 0 | 8 | 0 |
| MMA/AA | EA/AAm (20%) | M.F. 18% | 5 | 10 | 2 |
| MMA/EA/AA 72/20/8 | None | M.F. 18% | 3 | 8 | 0 |
| MMA/EA/AA 72/20/8 | EA/AAm 96/4 (20%) | M.F. 18% | 10 | 10 | 3 |
| N-methylol | None | None | 3 | 3 | 0 |
| N-methylol | None | "Epon 828" (5%) | 7 | 7 | 5 |
| N-methylol | EA/AA 96/4 (20%) | None | 7 | 7 | 3 |
| N-methylol | EA/AA 96/4 (20%) | "Epon 828" (5%) | 10 | 10 | 8 |
| Hydroxyl | None | M.F. (20%) | 0 | 7 | 0 |
| Do | None | U.F. (20%) | 3 | 7 | 0 |
| Do | EA/AAm 96/4 (20%) | M.F. (20%) | 5 | 10 | 3 |
| Do | EA/AAm 96/4 (20%) | U.F. (20%) | 7 | 10 | 3 |

What we claim is:

1. A coating composition adapted to form a hard but flexible coating upon baking on a substrate which contains essentially a mixture selected from the group consisting of:
   I. A mixture of
      (A) a copolymer resulting from the copolymerization of at least one neutral monoethylenically unsaturated monomer having ethylenic unsaturation as the sole reactive group with a monoethylenically unsaturated monomer containing carboxylic acid groups; said copolymer being blended with from 5% to 30% by weight of a compatible polymeric resin selected from the group consisting of copolymers of ethylacrylate and dimethylaminoethyl methacrylate, copolymers of ethyl acrylate and acrylamide, copolymers of butyl acrylate and acrylamide, copolymers of methyl methacrylate and acrylamide, rubbery copolymers of butadiene, methyl methacrylate and dimethylaminoethyl methacrylate, and copolymers of styrene and 2-vinylpyridine and,
      (B) a cross-linking agent selected from the group consisting of amine-aldehyde resins and materials containing at least two epoxide groups per molecule;
   II. a mixture of
      (A) a copolymer resulting from the copolymerization of at least one neutral monoethylenically unsaturated monomer having ethylenic unsaturation as the sole reactive group with acrylamide, said copolymer being blended with from 5% to 30% by weight of a compatible polymeric resin resulting from the copolymerization of ethyl acrylate with acrylic acid and,
      (B) as cross-linking agent, an amine-aldehyde resin;
   III. a mixture of
      (A) a copolymer resulting from the copolymerization of at least one neutral monoethylenically unsaturated monomer having ethylenic unsaturation as the sole reactive group with a monoethylenically unsaturated monomer containing amide groups; said copolymer having been reacted with an aldehyde to form N-alkylolated amide groups, said copolymer being blended with from 5% to 30% by weight of a compatible polymeric resin resulting from the copolymerization of ethyl acrylate and acrylic acid and,
      (B) as cross-linking agent, an epoxidized material containing at least two epoxide groups per molecule;
   IV. a mixture of
      (A) a copolymer resulting from the copolymerization of at least one neutral monoethylenically unsaturated monomer having ethylenic unsaturation as the sole reactive group with a monoethylenically unsaturated monomer containing carboxylic acid groups, said carboxylic acid groups having been in part reacted with an olefinic oxide to form $\beta$-hydroxyalkyl groups, said copolymer being blended with from 5% to 30% by weight of a compatible polymeric resin resulting from the copolymerization of ethyl acrylate and acrylamide and,
      (B) as cross-linking agent, an amine-aldehyde resin; and
   V. a blend of
      (A) a copolymer resulting from the copolymerization of at least one neutral monoethylenically unsaturated monomer having ethylenic unsaturation as the sole reactive group with a monoethylenically unsaturated monomer having an epoxide group in the molecule and a monoethylenically unsaturated monomer containing carboxylic acid groups, and,
      (B) from 5% to 30% by weight of a compatible polymeric resin resulting from the copolymerization of ethyl acrylate and acrylamide.

2. A coating composition as claimed in claim 1 wherein in the mixture I the copolymer (A) contains from 2% to 15% by weight of a copolymerized $\alpha,\beta$-unsaturated carboxylic acid the cross-linking agent (B) is an epoxidized material containing at least two epoxide groups per molecule, in a concentration of from 5% to 55% by weight of the copolymer (A) and a basic catalyst is present.

3. A substrate having deposited thereon a heat hardened film of the coating composition of claim 1.

References Cited by the Examiner

UNITED STATES PATENTS

| | | | |
|---|---|---|---|
| 2,604,464 | 7/1952 | Segall et al. | 260—837 |
| 2,944,044 | 7/1960 | Baer | 260—892 |
| 3,118,852 | 1/1964 | Christenson et al. | 260—855 |

FOREIGN PATENTS 218,594 11/1958 Australia.

MURRAY TILLMAN, *Primary Examiner.*

WILLIAM H. SHORT, *Examiner.*